Sept. 26, 1972  S. SCHER  3,694,317
METHOD OF AND INSTRUMENT FOR MICRO-BIOLOGICAL ANALYSIS
Filed May 31, 1968  2 Sheets-Sheet 1
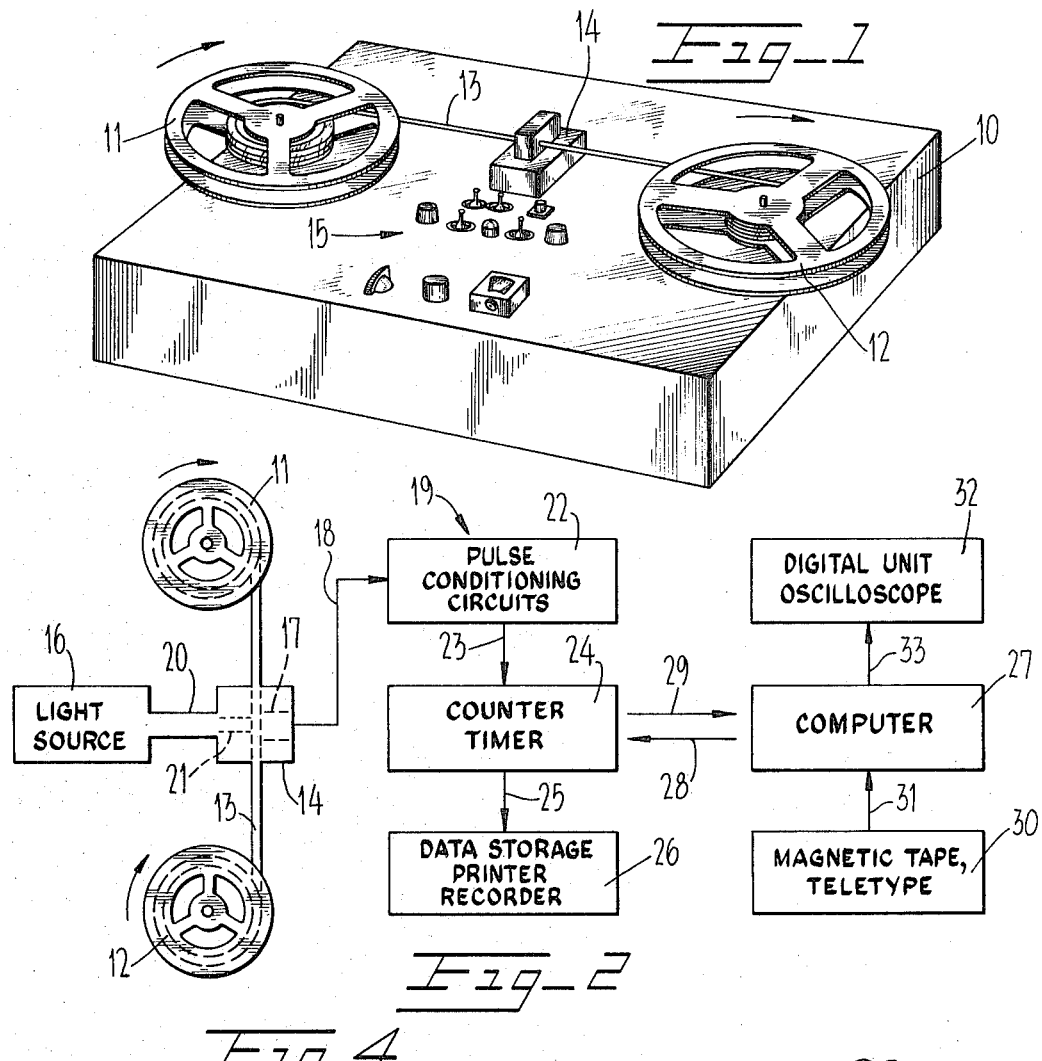
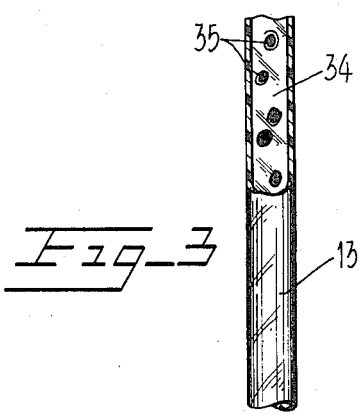
INVENTOR.
Stanley Scher
BY
Gardner + Zimmerman
ATTORNEYS

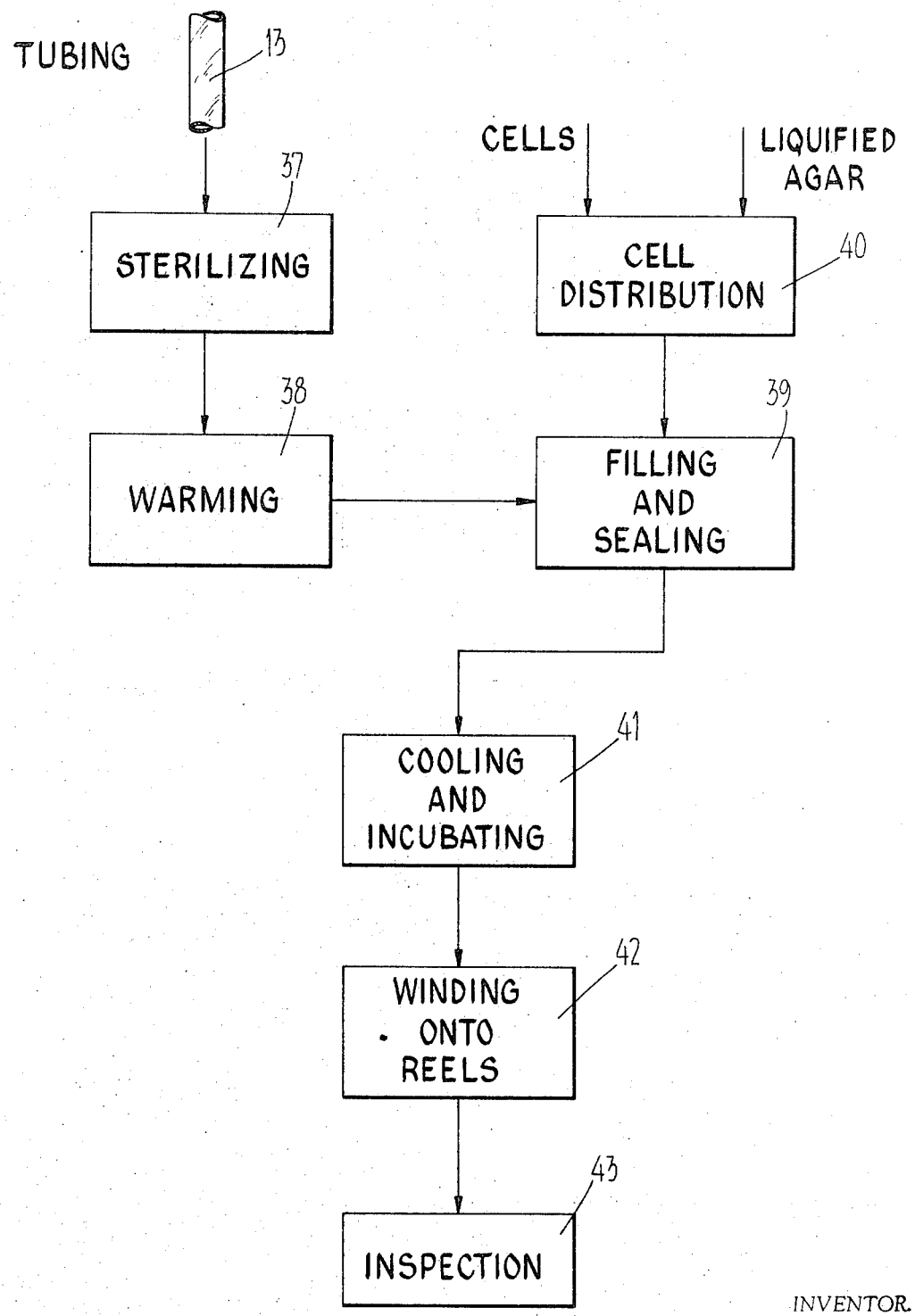

United States Patent Office 3,694,317
Patented Sept. 26, 1972

3,694,317
METHOD OF AND INSTRUMENT FOR MICRO-BIOLOGICAL ANALYSIS
Stanley Scher, 970 Contra Costa Drive, El Cerrito, Calif. 94530
Filed May 31, 1968, Ser. No. 733,617
Int. Cl. C12k 1/04
U.S. Cl. 195—103.5 R     4 Claims

ABSTRACT OF THE DISCLOSURE

Method of and apparatus for use in distributing, cultivating, treating and investigating microbial materials such as microorganisms and like biological materials. The method includes the steps of introducing into a transparent, flexible plastic tubing in a linear distribution therealong microbial cells suspended within a liquefied agar. The agar is then solidified and the cells cultured to grow colonies from those cells that are viable. The linear distribution of cells or colonies grown therefrom are then treated as desired and inspected sequentially to monitor the development thereof.

The apparatus includes a reel-type transport mechanism to move the tubing through an inspection station and present the microbial colonies sequentially thereat. An optical sensing system at such station discriminates differences in the optical characteristics of such colonies, and analyzer circuitry responsive to the sensing system provides monitoring information indicative of the detected differences.

---

This invention is concerned in general with detection and analysis of biological activity at the microbiological level, and it is more particularly concerned with a method of distributing, cultivating, treating and investigating microorganisms and like biological materials, and with apparatus for use therefor.

Traditionally, the most widely used technique for qualitative and quantitative investigations of microbial materials is often referred to as a plating technique and involves the random distribution of small numbers of microbial cells (in the range of from ten to several hundred, for example) on or near the surface of a semi-transparent agar gel contained within a transparent glass or plastic dish that is shallow and flat-bottomed and is usually referred to as a Petri dish. If provided with appropriate nutrients, such cells when viable develop into colonies within relatively short periods varying from a few hours to several days. The development of such colonies serves to amplify the biological characteristics of the microscopic cells so that they may become visible and therefore more suitable for analysis than the smaller groupings of cells as, for example, in testing the microbial materials for viability and in investigating the same for physiological, biochemical and genetic changes in the cell populations. The principal disadvantage in the Petri dish or plating technique is the tedium involved and the time consumed in making quantitative measurements where hundreds of colonies or other biologically-induced discontinuities are involved and must be visually counted.

The present invention has for one of its main objects the provision of an improved method of and instrumentation for use in distributing, cultivating, treating and analyzing microbial colonies, which improvement eliminates the tedium of visual counting, reduces the time expenditure required in visually analyzing the colonies or other biologically-induced discontinuities, and increases concurrently with enhancement in the speed of analysis, the accuracy and reproducibility of the results obtained. In practicing the inventive improvement, microbial cells are distributed linearly along a flexible capillary tubing, the cells are nurtured and the colonies resulting therefrom are transported sequentially through an inspection station at which they are detected and analyzed by a photosensitive detector arranged with any desired read-out units such as strip chart recorders and digital printers, or with an on-line computer for control and data analysis.

More particularly in this respect, the small numbers of microbial cells distributed in an agar are immobilized within a flexible capillary tubing which may be formed of a transparent, non-toxic plastic. After the agar has been introduced into the tubing and the ends thereof sealed to prevent subsequent dehydration and contamination, many tubes can be linked together in series, loaded onto reels and the cells incubated under specified physical and chemical conditions until the colonies or other discontinuities that develop within the agar can be detected, counted, or otherwise analyzed, or isolated for further study. During investigation of the colonies, the tubing is withdrawn from one reel and wound upon another while being advanced through an inspection station at which a photosensitive detector views the colonies sequentially as the tubing is advanced linearly through such station. Changes in or modulation of the light incident on the photosensitive detector caused by the colonies advanced therepast provide information concerning the colonies in the form of signals which are utilized by the particular read-out units or other equipment associated with the detector.

One of the most important advantages of providing a flexible tube as a container for the cells is that being so contained, the cells may be easily subjected to desired processing in addition to inspection. Reduction in the time required to count and otherwise process the colonies over that necessitated by the tradition plating technique should in many instances be at least several orders of magnitude. Also, inaccuracies are virtually eliminated which might otherwise result from errors in human judgment, tedium, eye strain, and because of smallness in the size of the samples; and the high level of reproducibility of the information attainable with instruments cannot be approached by conventional methods of visual inspection.

Moreover, there is a direct economic advantage resulting from the use of the improved technique because the tubing employed is quite small and less agar and nutrient are required to distribute and cultivate the microorganisms than in the Petri dish plating technique. Also, the materials used for the tubing can be selected to provide permeability properties that either exclude atmospheric gases or introduce special atmospheric conditions, inhibitory drugs, antibiotics, diagnostic or other chemical reagents. Further, the tubing is easily injectible for introduction therewithin of non-diffusible chemical agents and for removal of specific colonies for sub-culture or other purposes.

Additional objects and advantages of the invention will become apparent as the specification describes the particular embodiments illustrated in the accompanying drawings, in which:

FIG. 1 is a perspective view of instrumentation embodying the present invention;

FIG. 2 is a block diagram illustrating the components of such instrument;

FIG. 3 is an enlarged, broken view partly in section and partly in elevation of a section of the capillary tubing;

FIG. 4 is a graph showing the results of inspection by the apparatus of successive microbiological colonies distributed linearly along the capillary tubing; and FIG. 5 is a diagrammatic view illustrating various steps in the method of distributing, cultivating, and investigating microbial materials.

The instrument for processing and monitoring microbial colonies immobilized within a flexible transparent conduit or capillary tubing is shown in FIG. 1, and includes a box-like casing 10 having transport mechanism mounted thereon which takes the form of reel structure comprising a pay-out reel 11 and a take-up reel 12. The flexible tubing withdrawn from the reel 11 and wound upon the reel 12 is denoted generally with the numeral 13, and it is seen to pass through an inspection station defined by a photosensitive inspection system generally denoted 14. The tubing transport system is driven by electric motor means energized by a suitable control circuit therefor, and since the motor means and circuit may be completely conventional, neither are shown nor do they require further discussion. The various controls for the apparatus are provided along the top wall of the casing 10, as indicated generally at 15.

The components comprising the instrument of the apparatus are illustrated in block diagram form in FIG. 2; and as shown there, the inspection system 14 includes a light source 16 and an optical sensor 17 adapted to have light from the source 16 incident thereon. The optical sensor 17 is operative to provide output signals on a signal line 18 in response to changes in or modulation of the light incident thereon occasioned by movement of the microbial colonies through the inspection station as the tubing 13 is with drawn from the reel 11 and wound onto the reel 12. The signals appearing on the line 18 are delivered thereby to analyzer circuitry generally indicated with the numeral 19.

The inspection system 14 may take a variety of forms and, for example, the light source 16 can be a flying spot scanner and the optical sensor 17 a photoelectric device such as a photo field effect transistor energized by the light from the flying spot scanner traversing its photosensitive cathode. The inspection system 14 can also comprise an ordinary electric light source or lamp 16 and a photoelectric cell such as a P102, with the light from the source being directed to a predetermined restricted location with reference to the tubing 13 and cell 17 either by a lens system or by a fiber optics light pipe or conductor 20, as shown in FIG. 2. Light from the source 16 is directed toward the photoelectric cell 17 through a restricted adjustable aperture 21 so that only very small areas along the length of the tubing 13 are viewed or inspected at any instant so as to enable differentiation between successive microbial discontinuities.

The analyzer circuitry 19 may be conventional and comprises pulse conditioning circuits 22 adapted to provide and shape, in response to the input signals delivered thereto on the line 18, and then supply to a line 23 signal pulses suitable for processing in counter and timer circuits 24. The information or signal indicia appearing on an output signal line 25 from the circuits 24 are utilized to energize one or more data storage devices such as printer recorder 26 operative to provide a record of the monitoring information appearing on the signal line 25.

Further processing equipment may be used with the analyzer circuitry 19, and may include a computer 27 programmed to control the instrument by control information deliverd thereto via a signal line 28. The computer in turn receives information from the counter and timer circuits 24 via a signal line 29; and it may also receive as a control input thereto information from a program unit 30 which may supply information from a magnetic tape program, from a teletype infeed thereto, etc. Such information is supplied to the computer by a signal line 31. Output information from the computer 27 may also be delivered to appropriate monitoring mechanism used in conjunction therewith such as a digital unit oscilloscope 32 connected to the computer by a signal line 33.

The conduit or capillary tubing 13 is shown in greater detail in FIG. 3, and, as stated hereinbefore, is flexible and transparent and can be made from various materials including a wide variety of plastics such as the vinyl materials, silicone rubber materials, and cellulose acetate dialyzing materials. The particular material employed may be selected to provide various desirable characteristics as, for example, different permeability properties. In this respect, the silicone rubber materials can provide permeability to gases such as oxygen and carbon dioxide while being impermeable to liquids, and cellulose acetate materials can be selected which are permeable to water and to molecules below about 25 angstroms in diameter. In this reference, such selection of the tubing materials can enable the microorganisms distributed in the tubing to be exposed to specific environmental constraints, as for example, anaerobic or special atmospheric conditions, inhibitory drugs, and antibodies. The tubing 13 can be quite small and as a specific instance, it may have an inner diameter of about one millimeter.

As shown in FIG. 3, the tubing 13 contains an agar gel 34 or other suitable solidifying medium in which are dispersed microbial colonies 35 that have a linear separation along the tube 13 and define discontinuities therebetween. Thus, when the tube is advanced through the scanning system 14, the transmission of light from the source 16 thereof to the optical sensor 16 is modulated in accordance with the extent or size and the density or number of the cells within any colony 35 and, therefore, a chart or graph provided by the recorder unit 26 might have the general appearance of the graph shown in FIG. 4 which constitutes a plot against time of the optical characteristics (particularly optical transmittance) of each colony 35. Thus, the general level of light transmission through the transparent tube 13 and agar 34 therewithin is taken to be about 100% and therefore appears at the elevation denoted 100 along the vertical or $y$ axis of the graph constituting FIG. 4. The optical density and light transmission change in the presence of the colonies 35, and the various peaks along the time axis of the chart of FIG. 4 represent changes in the light transmission through the tubing respectively corresponding to successive linearly disposed colonies 35.

Thus, in the presence of the colony denoted 35a, the transmission of light has been reduced to slightly more than 90%; in the presence of the colony 35b the percentage of light transmission has been reduced even more to a value somewhat greater than 85%; and in the presence of the colony 35c the transmission has decreased to slightly less than 75%. Correspondingly, the light transmissions for the colonies 35d, 35e and 35f respectively approximate 77%, 92% and 72%.

The method of distributing, cultivating, treating, and investigation microbial materials is depicted in FIG. 5 and includes the step of sterilizing the conduit or tubing 13, which conduit in FIG. 5 is indicated as being delivered to a sterilizing unit 37. Tubing can be purchased from the manufacturer or distributor in a sterilized condition. However, if it is not, it must be sterilized to avoid contamination before the nutrient medium is introduced. The sterilizing unit 37 may take any conventional form and accomplish sterilization either chemically or by application of sterilizing temperatures to the tubing. The sterilized tubing 13 when taken from the unit 37 may be used immediately, or it may be stored in a sterilized condition for subsequent use in which event it will be warmed, as at a warming station 38, before having a liquefied agar introduced thereinto at a filling and sealing station 39. At such station the ends of the tubing usually are closed or sealed to prevent dehydration of the material therewithin and reduce contamination from external sources. A plurality of tubing pieces can be linked together in series if desired for continuous processing.

Prior to being introduced into the tubing 13 at the filling and sealing station 39, the liquefied agar has microbial cells dispersed therein such that the cells are distributed linearly along the tubing. The introduction of cells into the agar is indicated in FIG. 5 at a cell distribution unit 40. Before the agar and cells are introduced into the tubing the interior of the tubing may if desired, be treated with various agents for processing of the cells. The tubing 13 with the agar and cells immobilized therewithin is cooled to an appropriate temperature and maintained thereat to enable the cells to incubate in the presence of a suitable nutrient, and such cultivation of the cells is indicated as occurring at a station or unit 41. Either prior or subsequent to such cultivation of the cells at the station 41, the tubing is wound upon one or more reels as at a station 42, which reels form a part of the transport system heretofore described. Next, the tubing may be passed through processing stations as desired to treat the cells and then may be inspected, as indicated in FIG. 5 at 43, as by the prior described apparatus or instrumentation so as to monitor the microbial colonies or other discontinuities dispersed linearly along the tubing.

It is evident that a predetermined linear orientation of the microbial colonies is provided and maintained by immobilizing the same within the transparent, flexible capillary tubing 13 with the result that a sequential automatic monitoring of the development of the colonies is practical. Since the plastic tubing is easily penetrated by needle structure, selected mircobial colonies can be injected with desired agents at any time and, similarly, selected colonies can be withdrawn from the tubing at any time for subculture purposes or for any other reason. Since the tubing is small and inexpensive and because only a minimum amount of growth medium is introduced thereinto, the entire assemblage is inexpensive and therefore disposable after use.

In practicing the method, the agar may be maintained in a liquefied state at a temperature of about 40 to 45° C., and the tubing 13 is advantageously warmed to about this same temperature prior to introduction of the agar thereinto. At the filling and sealing station 39 the agar is introduced into the tubing in any convenient manner, as for example, by suction or by injection such as with a syringe or other pipetting device. The incubation of the microbial cells is effected for any desired period under specific physical and chemical conditions all as is well known and in accordance with conventional techniques. Moreover, the linear distribution of the cells in the closed tube makes them particularly conducive to the conventional treating and processing. To facilitate discrimination between various types of biochemical or physiological strains of microbial colonies along the tubing 13, various arrangements may be employed whenever necessary or desirable such as use of appropriate chemical indicators, tubing having special membrane characteristics, by introduction of special nutrient media, by utilization of specific light wavelengths, etc.

The monitoring instrumentation enables evidence of biological activity to be obtained in a much shorter time than is possible by conventional methods because by adjusting the characteristics, such as the width, of the aperture 21 to change the area of the tube being inspected by the detector, the inspection system can be conditioned to recognize objects approaching a few microns in diameter. Evidently, other techniques can be employed to change or adjust the area observed or inspected by the system, such as changing the sensitivity level thereof or by altering the optical characteristics of the system as by means of lens selection and interchange.

The technique is usable to detect, inspect or monitor substantially any biological change that results in a detectible increase or decrease in light absorbence by or transmittance through discreet particles or clearly defined zones. Thus, changes are detectible in light transmittance either as a consequence of the absorption of more light due to increases in opacity occasioned by microbial growth or as a consequence of the absorption of less light due to decreases in opacity resulting from breakdown of opaque materials as in lysis of bacterial cells by phage to leaving a clear plaque or zone. Thus, the technique can be employed, for example, in general microbiology environments as in the detection and enumeration of bacteria, algae protozoa, cells and tissue culture; in studies of growth, nutrition and metabolism; and in investigations of the physiology, ecology, biochemistry and enzymology of microorganisms.

Typical fields of use for the technique are in biochemical facilities including diagnostic and clinical laboratories, pharmaceutical research and production, sterility testing operations, and hospital clean-room monitoring; in the food and beverage industry for biological control of diary products, for food processing, and for operations involving brewery and other fermentation products; in industrial contamination control laboratories as in monitoring turbine fuels, hydraulic fluids, and other hydrocarbons; in public health facilities such as for water pollution control and sewage treatment laboratories, for biological warfare monitoring of air and water; and in research laboratories for microbiology, microbial genetics, virology, molecular biology, mycology, and like analyses.

While in the foregoing specification embodiments of the present invention have been set forth in considerable detail for purposes of making a complete disclosure thereof, it will be apparent to those skilled in the art that numerous changes may be made in such details without departing from the spirit and principles of the invention.

I claim:

1. A method of distributing, cultivating and monitoring microbial colonies and the like, the steps of providing a length of transparent, flexible capillary tubing, introducing into such tubing in a substantially linear distribution therealong living cells suspended within a growth medium to immobilize the cells within the tubing, maintaining the tubing at environmental conditions enabling the cells therewithin to incubate and form microbial colonies in an essentially linear array, and then inspecting the colonies sequentially in accordance with their linear succession within such tubing by viewing the same with photosensitive scanning means to detect changes in the optical characteristics thereof.

2. The method of claim 1, in which said tubing is transported at a predetermined lineal speed past said scanning means.

3. The method of claim 2 in which said tubing is wound and unwound onto and from reels positioned on opposite sides of said scanning means.

4. The method of claim 1 in which said scanning means produces output signals representative of variations in the optical properties of the microbial colonies disposed along the tubing.

References Cited

UNITED STATES PATENTS

| | | | |
|---|---|---|---|
| 3,574,063 | 4/1971 | Bowman | 195—103.5 R |
| 3,338,795 | 8/1967 | McBee | 195—127 |
| 2,779,232 | 1/1957 | Small | 324—710 PC |
| 2,480,312 | 8/1949 | Wolf | 324—710 PC |

OTHER REFERENCES

Yanagita, "J. Bacteriology" 71:381-2 (1956).

Haney et al., in "Analytical Microbiology," Kawanaugh-editor, pp. 227, 235-6 (1963).

Frobisher, "Fundamentals of Microbiology," 8th ed., Apr. 26, 1968, pp. 49-50.

A. LOUIS MONACELL, Primary Examiner

M. D. HENSLEY, Assistant Examiner

U.S. Cl. X.R.

195—139